Figures 1, 2:
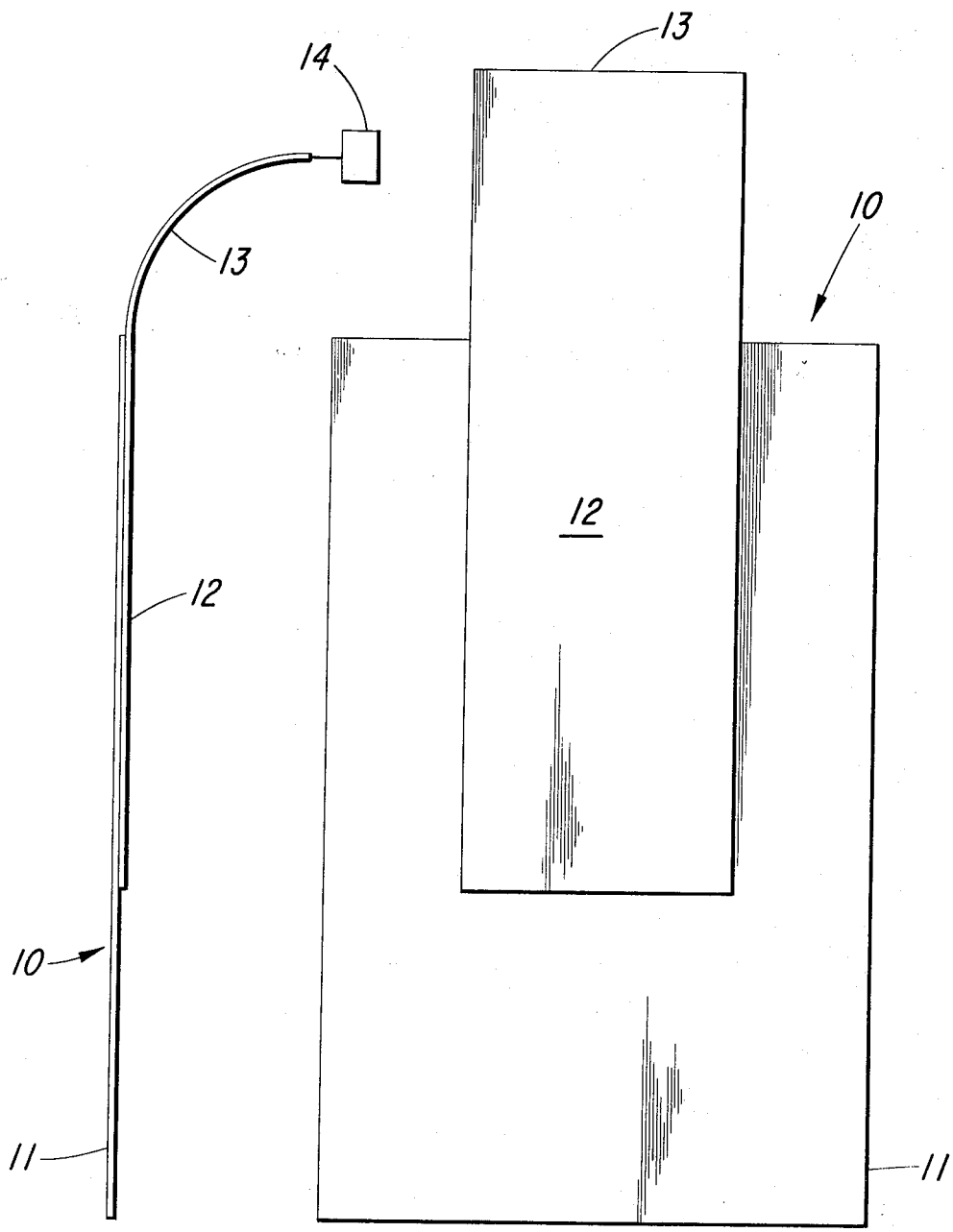

United States Patent [19]
Dalibor et al.

[11] 3,819,447
[45] June 25, 1974

[54] PROCESS FOR GLUING SOLID MATERIALS

[75] Inventors: Horst Dalibor, Hamburg-Harksheide; Richard Gutte, Oststeinbek; Gunter Stenzel, Hamburg, all of Germany

[73] Assignee: Reichhold-Albert-Chemie Aktiengesellschaft, Hamburg, Germany

[22] Filed: June 5, 1972

[21] Appl. No.: 259,457

[30] Foreign Application Priority Data
June 7, 1971 Switzerland............................ 8268/71

[52] U.S. Cl................ 156/330, 156/331, 260/80.6, 260/80.73, 260/80.81, 260/85.5 ES
[51] Int. Cl........ C09j 5/00, C08f 15/40, C08f 15/38
[58] Field of Search ........... 156/330, 331; 260/80.6, 260/80.73, 80.81, 85.5 ES

[56] References Cited
UNITED STATES PATENTS

| | | | |
|---|---|---|---|
| 2,718,515 | 9/1955 | Thomas | 260/80.5 |
| 2,994,676 | 8/1961 | Kucsan et al. | 260/29.4 |
| 3,037,963 | 6/1962 | Christenson | 260/72 |
| 3,207,718 | 9/1965 | Zimmerman et al. | 260/29.6 |
| 3,320,221 | 5/1967 | Wishman et al. | 260/85.5 |
| 3,509,086 | 4/1970 | Rohrbacher | 260/32.8 |
| 3,567,486 | 3/1971 | Remmington et al. | 117/47 |
| 3,585,063 | 6/1971 | Remmington | 117/47 |
| 3,726,739 | 4/1973 | Dalibor et al. | 156/308 |

*Primary Examiner*—Charles E. Van Horn
*Assistant Examiner*—Robert A. Dawson
*Attorney, Agent, or Firm*—Gordon W. Hueschen; John T. Reynolds

[57] ABSTRACT

The invention relates to a process for gluing solid materials with hot-melt adhesives based on reaction products of copolymers of esters of unsaturated acids with polyepoxide compounds. The copolymer employed is a reaction product of nitriles of $\alpha,\beta$-ethylenically unsaturated monocarboxylic or dicarboxylic acids, amides of $\alpha,\beta$-ethylenically unsaturated monocarboxylic or dicarboxylic acids, esters of $\alpha,\beta$-ethylenically unsaturated monocarboxylic or dicarboxylic acids, containing four to 12 carbon atoms in the alcohol radical and methyl methacrylate.

The adhesive bonds prepared according to this invention show considerably improved heat stability, better shear strength and peel strength.

7 Claims, 2 Drawing Figures

PROCESS FOR GLUING SOLID MATERIALS

BACKGROUND OF THE INVENTION

1. Prior Art

German Published Specifications 1,569,908 and 1,569,909 describe hot-melt adhesives based on styrene and acrylic acid esters or methacrylic acid esters and, optionally, copolymerized monomers possessing polar hydrophilic groups. Without the polar hydrophilic groups in the monomers, these hot-melt adhesives show good heat stability at 180° to 200°C, but the shear strengths and peel strengths on stressing the glue line are too low and furthermore the cold flow at room temperature is so great that faults in adhesion occur. Furthermore, hot-melt adhesives have already been described which additionally contain polar hydrophilic groups in the copolymerized monomers. These hot-melt adhesives show good shear strengths and peel strengths when the glue line is stressed, but the heat stability of the fused hot-melt adhesive at 180°C to 200°C in the presence of atmospheric oxygen is only 1 to 4 hours. Such products are therefore unsuitable for commercial use. Against this, a heat stability of 24 hours at 180°C to 200°C is aimed at for commercial use of the products, and at the same time the viscosity must remain constant or may only rise slightly.

2. Field of the invention

The present invention is based on the task of providing a process for gluing solid materials, which does not suffer from the indicated disadvantages or only suffers from them to a considerably lesser extent and which gives better shear strength and peel strength and considerably improved heat stability of the adhesive bonds.

The warmed hot-melt adhesives are applied as coating or film either in the molten state or in a state where they are capable of extrusion to the material to be bonded.

SUMMARY

It has been found that solid materials can advantageously be glued in the usual manner by applying warmed thermoplastics as hot-melt adhesives and allowing the fused thermoplastics to cool in contact with at least one material to be bonded, if the hot-melt adhesive employed consists of A. 99.5 – 90 percent by weight of reaction products of copolymers of:
  a. 1 – 20 percent by weight of nitriles of $\alpha,\beta$-ethylenically unsaturated monocarboxylic or dicarboxylic acids, used individually or as mixtures,
  b. 1 – 20 percent by weight of amides of $\alpha,\beta$-ethylenically unsaturated monocarboxylic or dicarboxylic acids, used individually or as mixtures,
  c. 40 – 97 percent by weight of esters of $\alpha,\beta$-ethylenically unsaturated monocarboxylic or dicarboxylic acids, used individually or as mixtures, and containing four to 12 carbon atoms in the alcohol radical and
  d. 1 – 30 percent by weight of methyl methacrylate and
B. 0.5 – 10 percent by weight of epoxide compounds and
C. optionally, solvents and/or extenders.

In the preferred embodiment of the process, a reaction product of the copolymer A already mentioned above, synthesized from components a to d, is employed together with the epoxide compound, the reaction product having been formed in the presence of a catalyst.

In the preferred embodiment of the present invention a product formed from the following components is employed as copolymer A:
  a. 3 – 7 percent by weight of acrylonitrile,
  b. 3 – 8 percent by weight of acrylamide,
  c. 70 – 90 percent by weight of 2-ethylhexylacrylate and
  d. 1 – 10 percent by weight of methylmethacrylate.

The following should be stated regarding the components from which the copolymer A employed is synthesized:
  a. Possible nitriles of $\alpha,\beta$-ethylenically unsaturated monocarboxylic or dicarboxylic acids, used individually or as mixtures, are:
Acrylonitrile, methacrylonitrile, maleic acid dinitrile or fumaric acid dinitrile or the mononitriles of the maleic acid or fumaric acid monoesters, with the alcohol radical in the monoester containing one to 18 carbon atoms.
  b. Possible amides of $\alpha,\beta$-ethylenically unsaturated monocarboxylic or dicarboxylic acids, used individually or as mixtures, are:
Acrylamide, methacrylamide, maleic acid diamide or fumaric acid diamide or the monoamides of maleic acid monoesters or fumaric acid monoesters, with the alcohol radical in the monoester containing one to 18 carbon atoms.
  c. Possible esters of $\alpha,\beta$-ethylenically unsaturated monocarboxylic or dicarboxylic acids, used individually or as mixtures, are:
n-Butyl acrylate, hexyl acrylate, 2-ethylhexyl acrylate, decyl acrylate and dodecyl acrylate or n-butyl methacrylate, hexyl methacrylate, 2-ethylhexyl methacrylate, decyl methacrylate and dodecyl methacrylate. n-Butyl acrylate and 2-ethylhexyl acrylate prove to be particularly advantageous.

The copolymers used as starting substances are obtained in accordance with customary manufacturing methods, such as polymerization in solvents, block polymerisation or graft polymerization, in the presence of polymerisation initiators, optionally with the conjoint use of chain regulators, by copolymerization of the $\alpha,\beta$-ethylenically unsaturated compounds. The most favorable results are obtained if the copolymerisation is carried out in the presence of solvents and the solvents, for example xylene or butanol, are subsequently removed by distillation. Suitable polymerization initiators are peroxides, such as benzoyl peroxide, di-tertiary butyl peroxide, lauryl peroxide or cumene hydroperoxide.

The copolymers should have a viscosity of 50 to 1,000 preferably 100 to 600 DIN/6 seconds, measured as a 50 percent strength by weight solution in xylene, at 20°C, in the event such copolymers are used for the production of hot-melt adhesives, which are worked in the molten state.

Since the present invention employs such products as hot-melt adhesives, which are worked as warmed thermoplastics, it is possible to use the hot-melt adhesive in the molten state; however very highly viscous hot-melt adhesives have to be applied as coating or film to at least one of the materials to be glued using an extrusion device. The expression hot-melt adhesive is used in the present invention for meltable reaction products or reaction products capable of extrusion.

The copolymers may also have a higher viscosity if they are worked into products meant for hot-melt adhesives capable of extrusion.

Polyepoxide compounds which can be used are those which contain more than one 1,2-epoxide group in the molecule and which can be reacted with the component A, for example:

The epoxides of multiple-unsaturated hydrocarbons such as vinylcyclohexene, dicyclopentadiene, cyclohexadiene, cyclododecadiene, cyclododecatriene, isoprene, 1,5-hexadiene, butadiene, polybutadiene, divinylbenzene and the like. Oligomers of epichlorohydrin and the like, glycidyl ethers of polyhydric alcohols such as of ethylene glycol, propylene glycol and butylene glycol, polyglycols, thiodiglycols, glycerol, pentaerythritol, sorbitol, polyvinyl alcohol, polyallyl alcohol and the like, as well as their reaction products with ethylene oxide and/or propylene oxide, epoxide ethers of polyhydric phenols such as resorcinol, hydroquinone 2,2'-, 2,4'- and/or 4,4'-dihydroxydiphenyl-methane, bis-(-hydroxy-3-methyl-phenyl)-methane, bis-(4-hydroxy-3,5-dichlorophenyl)-methane, bis-(4-hydroxy-3,5-dibromophenyl)-methane, bis-(4-hydroxyphenyl)-ethane, 2,2-bis-(4-hydroxyphenyl)-propane, 2,2-bis(4-hydroxy-3-methyl-phenyl)-propane, 2,2-bis-(4-hydroxy-3-chlorophenyl)-propane, 2,2-bis-(4-hydroxy-3,5-dichlorophenyl)-propane, bis-(4-hydroxyphenyl)-phenylmethane, bis-(4-hydroxyphenyl)-diphenylmethane, bis-(4-hydroxyphenyl)-4'-methylphenylmethane, 1,1-bis-(4-hydroxyphenyl)-2,2-trichloroethane, bis-(4-hydroxyphenyl)-4-chlorophenylmethane, 1,1-bis(4-hydroxyphenyl)-cyclohexane, bis-(4-hydroxyphenyl)-cyclohexylmethane, 4,4'-dihydroxydiphenyl-2,2'-dihydroxydiphenyl, 4,4'-dihydroxydiphenyl-sulphone as well as their hydroxyethyl ethers, phenol-formaldehyde condensation products, such as phenol-alcohols, phenolaldehyde resins and similar epoxides containing S and N (N,N-diglycidylaniline, N,N'-dimethyldiglycidyl-4,4'-diaminodiphenyl-methane) as well as epoxides which have been manufactured in accordance with customary processes from multiple-unsaturated carboxylic acids or singly unsaturated carboxylic acid esters of unsaturated alcohols, glycidyl esters, polyglycidyl esters, which can be obtained by polymerization or copolymerisation of glycidyl esters of unsaturated acids or are obtainable from other acid compounds, for example cyanuric acid, diglycidylsulphide, cyclic trimethylenetrisulphone or their derivatives and other compounds.

Instead of the abovementioned diepoxides or polyepoxides their mixtures, optionally in the presence of solvents or plasticizers, can equally well be reacted as component C in the process of the invention.

Furthermore, completely or partially epoxidized oils such as epoxidized soya oil, epoxidized linseed oil or fatty acid monoesters of oleic, linoleic or linolenic acid can be used, in which the alcohol radical can be $C_1 - C_{18}$.

The polyglycidyl ethers of 4,4'-dihydroxydiphenyl-propane of the isomers of dihydroxydiphenylmethane, of the polyhydric alcohols such as etylene glycol, propylene glycol and butylene glycol, thiodiglycols, glycerol, pentaerythritol, sorbitol and their reaction products with ethylene oxide and/or propylene oxide are preferentially employed as the polyepoxide compound.

It is also possible to use, as polyepoxide compounds, polymer resins which contain the glycidyl esters of the following unsaturated carboxylic acids: acrylic, methacrylic, fumaric, maleic, crotonic and itaconic acid and/or allyl glycidyl ether; the molecular weight of the resins should be 5,000–50,000 and resins which have an epoxide equivalent weight of about 400 – 4,000 are preferred. Such polymers can be synthesized from:

a. 1 – 20 percent by weight of nitriles of $\alpha,\beta$-ethylenically unsaturated monocarboxylic or dicarboxylic acids, used individually or as mixtures, B. 1 – 20 percent by weight of glycidyl esters of unsaturated carboxylic acids such as acrylic, methacrylic, fumaric, maleic, crotonic and itaconic acid and/or allyl glycidyl ether, C. 40 – 98 percent by weight of esters of $\alpha,\beta$-ethylenically unsaturated monocarboxylic or dicarboxylic acids, used individually or as mixtures, and containing four to 12 carbon atoms in the alcohol radical, d. 0 – 30 percent by weight of methyl methacrylate and e. 0 – 40 percent by weight of styrene.

a. Possible nitriles of $\alpha,\beta$-ethylenically unsaturated monocarboxylic or dicarboxylic acids, used individually or as mixtures, are: acrylonitrile, methylacrylonitrile, maleic acid dinitrile or fumaric acid dinitrile or the mononitriles of maleic acid monoesters or fumaric acid monoesters, with the alcohol radical in the monoester having one to 18 atoms.

B. Possible esters of $\alpha,\beta$-ethylenically unsaturated monocarboxylic or dicarboxylic acids, used individually or as mixtures, are: n-butyl acrylate, hexyl acrylate, 2-ethylhexyl acrylate, decyl acrylate and dodecyl acrylate, or n-butyl methacrylate, hexyl methacrylate, 2-ethylhexyl methacrylate, decyl methacrylate and dodecyl methacrylate. n-Butyl acrylate and 2-ethylhexyl acrylate prove to be particularly advantageous.

These polyepoxide copolymers used as starting substances are manufactured in accordance with customary manufacturing methods, such as polymerization in solvents, block polymerization or graft polymerization, in a manner which is in itself known.

In order to manufacture the hot-melt adhesive, the copolymers containing amide groups, used as starting substances, together with polyepoxide compounds, are thoroughly distributed, or dissolved in one another and reacted, in the fused state at elevated temperatures of about 110° to 200°C, in an appropriate reaction kettle or stirring apparatus, such as a kneader or mixer. The reaction is preferably carried out in the presence of catalysts. Boron trifluoride adducts are preferred as catalysts.

Suitable $BF_3$-fluoride adducts are the $BF_3$-amine complexes, for example those formed from the following amines and $BF_3$: n-amylamine, aniline, $\beta$-phenylalanine = 2-aminoethyl-benzene, 2-ethylbenzimidazole, benzylamine, trans-bornylamine, 1-amino-3-methylbutane, 1,4-diaminobutane, n-butylamine, t-butylamine, n-butylcyclohexylamine, cyclohexylamine, n-decylamine, diethylamine, diisopropylamine, diisobutylamine, dimethylamine, laurylamine = n- dodecanamine, 2-aminoethanol; ethylamine, hexadecanamine, 1-aminoheptane, 2-aminoheptane, n-hexylamine, 2,4-dimethylimidazole, morpholine, methyl-amine, n-nonylamine, octadecanamine, 3-aminopentane, 3-amino-3-methylpentane, n-pentadecylamine, piperazine, propylamine, pyrrolidine, myristylamine = tetradecanamine, tridecanamine, triethylamine and trimethylamine.

In order to facilitate the addition of the $BF_3$-amine complexes, or other catalysts, the latter can be dissolved by means of suitable solvents before addition to the mixture of components A and B, and optionally C, which is to be reacted.

Besides $BF_3$-amine-complexes already mentioned as catalysts, tertiary organic amines can also be employed for the reaction of component A and component B, for example diaza-bicyclo octane, 2,4,6-tris(dimethylaminomethyl)phenol, bis(N,N-dimethylaminoisobutylidene) melamine, dimethylbenzylamine, α-methylbenzyldimethyl amine, 2-(dimethylaminomethyl)phenol, tetramethyl guanidine, tetramethyl urea, 1,4-N,N'-tetramethyl diaminobutane.

Hot-melt adhesives produced therewith show discoloring of the melt, which appears much earlier and more intensively compared with the $BF_3$-amine-complexes.

Alkali salts of fatty acids having eight to 10 carbon atoms can also be employed, for example lithium ricinoleate, lithium octoate or isooctoate. Also lithium naphthenates, potassium naphthenates, sodium naphthenates, and octoates, can be employed as catalyst, as well as sodium and potassium carbonate, organic tin (II) or tin (IV) compounds as, for instance, Sn(II)octoate, Sn(II)naphthenate, dibutyltin(IV) dilaurate and dibutyltin(IV)oxide. Quaternary ammonium bases or salts can also be used as catalysts, such as trimethyllauryl ammoniumhydroxide or trimethylphenylhydroxide respectively or the chloride or iodide of these bases.

Phosphonium compounds of the following formula can also be employed:

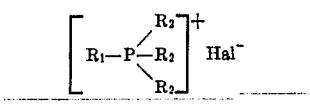

wherein $R_1$ is an alkyl radical of one to 10 carbon atoms and $R_2$ is an aromatic or aliphatic radical, such as phenyl or butyl. Hal means chlorine, iodine or bromine.

The abovementioned compounds are also used as catalysts for the reaction of the components A and B.

Suitable solvents which can be used are, for example, benzaldehyde, toluylaldehyde, salicylaldehyde, lactones such as β-propiolactone, β-butyrolactone, γ-butyrolactone, δ-valerolactone and -caprolactone, and also esters, known as monomeric plasticizers, of monocarboxylic and dicarboxylic acids with monoalcohols, such as tetrahydrofurfuryl adipate, phthalic acid esters of monoalcohols, for example n-butanol, amyl alcohol, 2-ethylhexanol, nonanol or benzyl alcohol, used individually or as mixtures, furfuryl alcohol, lower-molecular and higher-molecular polyols, for example glycerine, trimethylolpropane or ethylene glycol, as well as ethoxylated or propoxylated polyols, or esters of phosphoric acid such as tricresyl phosphate and others.

The best reaction products are obtained if the mixture of the components A and B is converted, at about 110°C to 200°C, into a homogeneous melt which is of relatively low viscosity, and about 1 to 20 percent by weight, preferably 10 to 100 percent by weight, of the catalyst relative to the weight of the component B, are introduced into the melt, after which the melt is further stirred for about 2 to 300 minutes, preferably 10 to 60 minutes, at 150° to 180°C to bring about the reaction. The melt of the resulting reaction product then has, in the preferred embodiment, a viscosity of about 10,000 to 30,000 cP at 180°C, if the product is worked as melt.

In the event borontrifluoride adducts are used as catalyst, 1 to 50 percent by weight are employed, preferably 10 to 30 percent by weight, relative to the weight of component B.

However, for special purposes, reaction products with lower or higher viscosity values can also be manufactured and used.

This increase in viscosity can be adjusted by selection of the polyepoxide compound. The higher the starting viscosity of the copolymers, about 500 to 1,000 DIN/6 seconds, measured as a 50 percent strength by weight solution in xylene at 20°C, the lower the amount of polyepoxide compound added, being about 0.3 to 4.0 percent by weight. The most advantageous addition is about 0.5 to 2 percent by weight. In case the production is carried out with a monoepoxide, the addition amounts to about 1 to 10 percent by weight, preferably about 2 to 6 percent by weight.

If the copolymers have lower viscosities, say 50 to 500 DIN/6 seconds, measured as a 50 percent strength by weight solution in xylene at 20°C, the proportion of polyepoxide or monoepoxide compound will be 1 to 10 percent by weight, the most advantageous addition being about 1 to 6 percent by weight.

The addition of epoxide compound depends on the molecular weight and the number of epoxide groups of the epoxide compound.

In a further embodiment, the hot-melt adhesive can additionally contain a component "C" which acts as an extender and/or as a solvent in the melt, in which there may be a change in the melt viscosity to lower or higher viscosity values. The addition can be between 5 and 300 parts by weight relative to 100 parts by weight of copolymer.

As component "C" it is possible to use: natural and synthetic resins (corresponding to the description in Ullmann's Encyclopaedia 1963, volume 8), plasticizers, waxes and fillers.

Possible natural resins are: balsam, root, tall, colophony and copal resins, as well as modified natural resins which belong to the class of the diterpene, sesquiterpene and triterpene compounds and which mainly contain abietic acid, which are esterified with polyalcohols such as, for example, glycerol, pentaerythritol or glycols, or also contain unsaturated monocarboxylic and dicarboxylic acids of the type of acrylic, methacrylic, maleic or fumaric acid, which are also esterified with the polyalcohols. Copolymers of esterified natural resins with styrene, vinyltoluene or acrylic or methacrylic acid esters have also proved suitable. Terpene-phenolic resins, and colophony resins modified with phenolic resins, are also advantageous. Thermally degraded natural rubber is a valuable suitable component.

Possible synthetic resins are:

a. Polymers based on olefines, for example polyethylene or polypropylene waxes, and low molecular rubbers which are manufactured by polymerization of isobutylene, butadiene, isoprene, styrene, vinyl ethers whereof the alcohol radical is $C_1 - C_8$, vinyl esters in which the acid radical is $C_1 - C_{12}$, acrylonitrile, vinylcyclohexene and methylstyrene.
b. Resins based on hydrocarbons such as xyleneformaldehyde, cumarone and indene resins.
c. Ketone resins based on aliphatic ketoneformaldehyde resins, wherein the ketone can be acetone, methyl ethyl ketone and cyclohexanone.
d. Polyamide resins which are obtained by reaction of monocarboxylic and dicarboxylic acids with aliphatic and aromatic polyamines.
e. Plasticizers based on phthalic acid, adipic acid, sebacic acid, azelaic acid and phosphoric acid esters, wherein the alcohol radical is $C_1$ to $C_{13}$. Additionally, the phosphoric acid esters can be esterified with phenol or cresol.
f. Mineral oils.

Furthermore, inorganic fillers can be employed, such as barium sulphate, calcium carbonate, calcined calcium sulphate, magnesium silicate, calcium magnesium carbonate, anhydrous aluminum oxide, asbestos powder and fibers, quartz powder and mixtures of these substances.

The amount and nature of the added component "C" must be suited to the particular requirements, which can differ greatly. Miscibility is essential and the requisite adhesive power must be reached.

The reaction products used according to the invention possess a high heat stability when used as hot-melt adhesives and therefore can be processed as melt at the processing temperatures in question, of about 200°C, for a period of 12 to 48 hours without major changes in viscosity. The reaction of the copolymer containing amide groups, as component A, with the polyepoxide compound, as component B, brings about a condensation whereby an increase in viscosity occurs, which at temperatures of up to 200°C, however, still leads to liquid and fusible hot-melt adhesives, or adhesives capable of extrusion, which after application to the most diverse materials show good adhesion and very good cohesion at room temperature and also at a temperature of 50° to 100°C, with the heat stability of the adhesive bond being substantially increased relative to an adhesive bond using the starting polymer A alone.

After application to the materials to be glued, the hot-melt adhesives used according to the invention give firmly adhering films which can be tacky or non-tacky at room temperature.

Films which can be glued at room temperature are described as self-adhesive hot-melt adhesives. Hot-melt adhesives, which do not give adequate surface tackiness of the films at room temperature, have to be activated by raising the temperature. The most preferred embodiment is a film which still adheres at room temperature and has good surface tackiness.

The reaction products used according to the invention possess, as hot-melt adhesives, good adhesion to the customary materials, such as wood, leather, paper, metal, glass, lacquered metal surfaces, textiles and plastic films. For gluing at temperatures of 0° to 10°C, an addition of ester plasticizers proves to be advantageous. The incorporation of customary fillers and of the other extenders mentioned, such as baryte, chalk and quartz powder, to an amount of up to 50 percent by weight, has no reducing influence on the strength of the adhesive bond.

Materials for gluing are the known industrial materials, such as plastics, leather, paper, cardboard, textiles, metals, glass or wood. For gluing, the reaction products used as hot-melt adhesives are applied, in the manner customary for hot-melt adhesives, as a thin layer in the fused state or in the state capable of extrusion onto the materials, and are subsequently glued to the other material. For this purpose, the reaction products can be used, as hot-melt adhesives, either alone or as a mixture with other styrene-acrylic ester or methacrylic ester copolymers. It is furthermore possible to mix the products with the customary additives, fillers and pigments, such as chalk, carbon black, baryte, kaolin, zinc oxide or calcium oxide, with resins, such as balsam resins or colophony esters, or, for example, with waxes, such as montan waxes, and to employ melts of the mixture for gluing.

The reaction products employed according to the invention can be used as hot-melt adhesives in the machines customary for hot-melt adhesives, for example by application from a heated nozzle (hot-casting machine), by doctor blades or overheated rollers or by extrusion devies. It is also possible to apply the fused hot-melt adhesive in a first process step and to allow the melt to solidify and only to effect the gluing subsequently at room temperature. Hot-melt adhesives which possess too low surface tackiness, say "tack" 2-6 (the significance of the expression "tack" will be explained later), can be used for gluing by thermal activation of the adhesive layer obtained, for example in a high frequency field, and by hot pressing.

As compared to known hot-melt adhesives, the reaction products which are employed according to the invention are distinguished by surprisingly high heat stability so that they can be kept as a melt for an entire working day without changing visibly. They are insensitive to local overheating. They can be used by high frequency gluing. They furthermore possess a sufficient viscosity-temperature dependence, so that the liquid melts show good processability.

In the preferred embodiment, the reaction products used as hot-melt adhesives are applied hot to an adhesive carrier which is to be glued. Gluing is subsequently effected in the cold state by bringing the article to be glued into contact with the adhesive layer, whereupon gluing takes place.

Preferred fields of use for the self-adhesive reaction products, used according to the invention as hot-melt adhesives, are in coating the back of self-adhesive floor coverings, coating self-adhesive shock-absorbing coverings and coating covering strips and decorative films, whereby the carrier may consist of plastic sheets, paper, fiber tiles, cardboard, bituminous felts and others.

In these cases, the reaction products employed according to the invention as self-adhesive hot-melt adhesives are, in a first process step, applied in the molten state to the material and subsequently the adhesive layer is covered with a release film or, in the case of covering strips, with an appropriately impregnated back of the covering strip, until the gluing is carried out. In a second process step, the gluing is then carried out at a later point in time by removing the release film and pressing the coated part onto the base with its hot-melt adhesive side. Hereupon gluing takes place at room temperature without activation of the hot-melt adhesive film.

In order to produce successfully the hot-melt adhesive of this invention on an industrial scale, first a model preparation is carried out on a laboratory scale for formulating the fitting amount of polyepoxide compound and catalyst.

The shear strength and peel strength and workability are tested of the hot-melt adhesive obtained in the model preparation.

If the workability is not sufficient for the intended purpose, the model preparation is then repeated using a smaller amount of the polyepoxide compound. If the shear strength and peel strength is too low the model preparation is repeated with an increased addition of the polyepoxide compound. The model reaction can be carried out with or without addition of the catalyst depending on the intended use. It is, for instance, possible to react the mix without the catalyst first and thus ascertain the kind and amount of optimal combination of copolymer and polyepoxide compound. In a further model reaction the kind and amount of suitable catalyst will be determined.

The result of this model preparation can be transferred to an industrial scale and therefore needs to be carried out only once for working out a recipe useful for the industrial production of the hot-melt adhesive of this invention.

To assess the surface tackiness, a rating of "tack" 1 to "tack" 10 was chosen.

Tack 1 = non-sticky at room temperature
Tack 2 – 6 = inadequate surface tackiness at room temperature
Tack 7 = adequate surface tackiness at room temperature
Tack 8 = satisfactory surface tackiness at room temperature
Tack 9 = good surface tackiness at room temperature
Tack 10 = very good surface tackiness at room temperature The melt viscosities were determined in a viscometer of the Epprecht-Rheomat 15 type.

The shear strength was determined according to DIN 53,273 using, as the material, a 5 cm broad polyester film based on terephthalic acid (Hostafan films from Kalle) of 0.1 mm thickness. The overlap was 5 mm. The peel strength was determined according to DIN 53,274, also employing a polyester film based on terephthalic acid (Hostafan film), 0.1 mm thick and 5 cm wide. The adhesive was applied as a melt, in a film thickness of 150$\mu$, onto the film by means of a film-spreader, the film being cooled from the back and the gluing being carried out after the adhesive layer had cooled. The heat resistance was determined as follows: bituminized heavy paper containing 50 percent by weight of bitumen was coated hot by means of the hot-melt adhesive. A 5 cm wide and 15 cm long strip of this heavy paper was glued with the coated side to a metal sheet at room temperature, producing a glued surface of 50 cm². After 24 hours' storage at room temperature, the glue bond was heat-treated for 5 minutes at 70°C and using a 50 g weight, the force of which acted at an angle of 90° to the glue line, the time at which the glued strip separated from the metal sheet at 70°C was determined (see drawing).

In the drawing, FIG. 1 shows a bottom view of a test device for the determination of heat resistance, and FIG. 2 shows a side elevation of the test device with a test weight attached.

Test device 10 shown in FIGS. 1 and 2 comprises metal plate 11 to which is affixed a portion of bituminous heavy paper strip 12 by means of the adhesive to be tested. Weight 14 is attached to free end 13 of strip 12 as shown in FIG. 2. Copolymer 1:

A mixture of:
250 parts by weight of toluene,
50 parts by weight of isobutanol,
20 parts by weight of acrylamide,
500 parts by weight of 2-ethylhexyl acrylate,
35 parts by weight of acrylonitrile, and
95 parts by weight of methyl methacrylate is heated to the boil under reflux in a three-neck flask equipped with a stirrer and thermometer, and a mixture of
50 parts by weight of toluene, and
4 parts by weight of di-tertiary butyl peroxide are added over the course of 1 hour, after which the mixture is polymerized for a further 6 to 8 hours under reflux. After reaching a solids content in the solution of approximately 65 percent by weight the solvent mixture is distilled off in vacuo up to 200° C. The resin, as a 50 percent strength by weight solution in xylene, has a viscosity of 300 DIN/6 seconds at 20° C.

Example 1: Manufacture of the Reaction Product 1

100 parts by weight of copolymer 1 (as component A) are mixed with 1 part by weight of a solid epoxide resin (as component B) which has been manufactured by reaction of bisphenol A and epichlorohydrin in an alkaline medium and which has an epoxide equivalent weight of 450 – 525 and a Durran softening point of 65° – 75° C., and the whole is heated by warming to about 160° C. in order to give a homogeneous melt of low viscosity.

0.3 part by weight of a boron trifluoride complex based on benzylamine, as a 45 percent strength solution in dioctyl phthalate is then added with good stirring. The temperature is raised to about 180°C and is kept thereat for about 30 minutes longer.

The shear strength and peel strength were determined in the manner already described by means of an 0.1 mm polyester film coated with a 150$\mu$ adhesive film.

Shear strength : 5.5 Kp/cm²
Peel strength : 0.8 Kp/cm
Heat resistance: 9 minutes While the hot-melt adhesive showed a rise in viscosity after 24 hours' storage at 180°C, the product still possessed very good processability.

99.5 parts by weight of reaction product 1 and 0.5 part by weight of a customary anti-aging agent based on phenolic compounds were mixed at about 180°C. The resulting hot-melt adhesive was applied as a melt, at a temperature of about 180°C in a film thickness of 300$\mu$ onto the back of a textile floor covering, using a film spreader.

The hot-melt adhesive layer was covered, while still warm, by placing silicone paper on it. At the use site, the silicone paper was pulled off at room temperature (20°C). The floor covering coated with the hot-melt adhesive was then pressed manually against a concrete base.

The gluing is then finished. The strength of the adhesive bond approximately corresponds to the test values indicated above.

Example 2:

Manufacture of Reaction Product 2

100 parts by weight of copolymer 1 (as component A) are mixed with 1.5 parts by weight of a solid epoxide resin (as component B) which has been manufactured by reaction of bisphenol A and epichlorohydrin in an alkaline medium and which has an epoxide equivalent weight of 450 – 525 and a Durran softening point of 65° – 75°C, and the whole is heated by warming to about 160°C in order to give a homogeneous melt of low viscosity. 0.4 part by weight of a boron trifluoride complex based on benzylamine, as a 45 percent strength solution in dioctyl phthalate, is then added with good stirring. The temperature is raised to about 180°C and is maintained thereat for about a further 30 minutes.

The shear strength and peel strength were determined in the manner already described, using an 0.1 mm polyester film coated with a 150 $\mu$ adhesive film.

Shear strength : 6.2 Kp/cm$^2$
Peel strength : 0.9 Kp/cm
Heat resistance : 11 minutes The hot-melt adhesive used consisted of 99.5 parts by weight of the reaction product 2 with an added 0.5 part by weight of an anti-oxidant based on phenolic compounds.

While the hot-melt adhesive showed a rise in viscosity after 24 hours' storage at 180°C, this product could still be processed very well. Surface tackiness at 20°C: "tack" 9.

99.5 parts by weight of the reaction product 2 and 0.5 part by weight of customary anti-ageing agent based on phenolic compounds were mixed at about 180°C. The resulting hot-melt adhesive was applied as a melt, at a temperature of about 180°C, at a film thickness of 200 $\mu$, by means of a film spreader, onto a bituminized heavy paper containing 50 percent by weight of bitumen.

The hot-melt adhesive layer was covered, while still warm, by placing a silicone paper on it. At the place of use, the silicone paper was pulled off at room temperature (20°C). The bituminized heavy paper coated with the hot-melt adhesive was then glued manually into the cavity of a car door made of bodywork sheet metal, which had been primed in the usual manner. The glue bend is then finished. The strength of the glue bond correspond to the test values indicated above.

Example 3:

Manufacture of Reaction Product 3

100 parts by weight of copolymer 1 (as component A) are mixed with 2 parts by weight of a solid epoxide resin (as component B) which has been manufactured by reaction of bisphenol A and epichlorohydrin in an alkaline medium and which has an epoxide equivalent weight of 875 – 1,000 and a Durran softening point of 93° – 104°C, and heated by warming to about 160°C in order to give a homogeneous melt of low viscosity. 0.4 part by weight of a boron trifluoride complex based on benzylamine, as a 45 percent strength solution in dioctyl phthalate, is then added with good stirring. The temperature is raised to about 180°C and maintained thereat for about 30 minutes longer.

The shear strength and peel strength were determined in the manner already described, using an 0.1 mm polyester film coated with 150 $\mu$ adhesive film.

Reaction product 3 is used as the hot-melt adhesive.

Shear strength : 5.4 Kp/cm$^2$
Peel strength : 0.8 Kp/cm
Surface tackiness at 20°C : "tack" 8 – 9
Heat resistance at 70°C : 7 minutes While the hot-melt adhesive showed a rise in viscosity after 24 hours' storage at 180°C, this product, however, could still be processed very well.

99.5 parts by weight of reaction product 3 and 0.5 part by weight of a customary anti-aging agent based on phenolic compounds were mixed at about 180°C. The resulting hot-melt adhesive was applied as a melt at a temperature of about 180°C, by means of a film spreader, in a film thickness of 80 $\mu$ onto soda kraft paper which is smooth on both sides. The soda kraft paper is provided in the usual manner, on the side free of hot-melt adhesive, with a non-stick layer based on silicone resin. Thereafter the coated soda kraft paper was wound up into a roll.

At the place of use, the roll was unwound at room temperature (20°C) and the strip was pressed, with the hot-melt adhesive side, against the surface to be covered.

The glue bond is then finished.

The strength of the glue bond corresponds to the test values indicated above.

Example 4:

Manufacture of the Reaction Product 4

100 parts by weight of copolymer 1 (as component A) are mixed with 3 parts by weight of a solid epoxide resin (as component B) which has been manufactured by reaction of disphenol A and epichlorohydrin in an alkaline medium and which has an epoxide equivalent weight of 875 – 1,000 and a Durran softening point of 93° – 104°C, and heated by warming to about 160°C in order to give a homogeneous melt of low viscosity. 0.6 part by weight of a boron trifluoride complex based on benzylamine, as a 45 percent strength solution in polypropylene glycol is then added with good stirring. The temperature is raised to about 180°C and is maintained thereat for about a further 30 minutes.

The shear strength and peel strength were determined in the manner already described, by means of an 0.1 mm polyester film coated with a 150 $\mu$ adhesive film.

Shear strength : 5.8 Kp/cm$^2$
Peel strength : 0.8 Kp/cm
Heat resistance at 70°C : 9 minutes While the hot-melt adhesive showed a rise in viscosity after 24 hours' storage at 180°C, this product could still be processed very well.

99.5 parts by weight of reaction product 4 and 0.5 part by weight of a customary anti-aging agent based on phenolic compounds were mixed at about 180°C. The resulting hot-melt adhesive was applied as a melt at a temperature of approx. 180°C, at a layer thickness of 200$\mu$, onto a bituminized heavy paper containing 50 percent of bitumen.

The bituminized heavy paper coated on one side with the hot-melt adhesive is covered on the hot-melt adhesive side with a release film, for example suitably impregnated paper or a suitable plastic film. The end user removes the cover present on the hot-melt adhesive side and brings the article to be glued, for example car bodywork sheet metal, into contact with the hot-melt adhesive side, and presses the bituminized heavy paper against it; the latter thereafter firmly adheres to sheet metal.

Manufacture of the Polyepoxide Compound 1

600 g of xylene are heated under reflux in a glass flask equipped with a reflux condenser and stirrer and the following mixture is added thereto over the course of 4 hours: 192 g of styrene, 300 g of isobutyl methacrylate, 108 g of glycidyl methacrylate and 18 g of 75 percent strength dibenzoyl peroxide in water, polymerization is continued with addition of a further 2 g of di-tert.-butyl peroxide for 6 hours until the solids content is 50 percent. The solvent is distilled off in vacuo at 180°C and a solid resin with a melting point of about 70°C is obtained.

The viscosity, as a 50 percent strength solution in xylene, is 110 cP at 20°C.

Example 5:

Manufacture of Reaction Product 5

100 parts by weight of copolymer 1 (as component A) are mixed with 2 parts by weight of the polyepoxide compound 1 (as component B) and heated by warming to about 160°C in order to produce a homogeneous melt of low viscosity. 0.4 part by weight of a boron trifluoride complex based on benzylamine, as a 45 percent strength solution in dioctyl phthalate, is then added with good stirring. The temperature is raised to about 180°C and is maintained thereat for about a further 30 minutes.

Shear strength : 6.2 Kp/cm²
Peel strength : 0.8 Kp/cm
Heat resistance at 70°C : 18 minutes The resulting hot-melt adhesive has a substantially increased heat resistance and shear strength, as compared to the starting copolymer. In other respects, the further use can take place as described in Example 4.

The carrier material, for example bituminized heavy paper, is coated with the reaction product 5, at a coating thickness of 200 μ, by knife-coating, rolling or casting at a temperature of about 180°C.

The material can be used as described in Example 4. The adhesive bond corresponds to the test data which have been given.

Manufacture of Copolymer 2

250 g of toluene, 50 g of isobutanol, 40 g of acrylamide, 540 g of 2-ethylhexyl acrylate, 26 g of acrylonitrile and 54 g of methyl methacrylate are heated in a glass flask equipped with a reflux condenser and stirrer and a mixture of 50 g of toluene and 4 g of ditert.-butyl peroxide is added over the course of 90 minutes, and the mixture is polymerized, with the addition of a further 1.5 g of di-tert.-butyl peroxide, to a solids content of 65 percent. Thereafter the solvent mixture is distilled off in vacuo at 180°C. The copolymer has a solids content of 100 percent. The viscosity of a 25 percent strength solution in xylene is 1,000 cP at 20°C.

Example 6:

Manufacture of Reaction Product 6

100 parts by weight of copolymer 2 component A) are mixed with 0.5 part by weight of polyepoxide compound 1 as the polyepoxide compound (component B) and heated by warming to about 160°C in order to obtain a homogeneous melt of low viscosity. 0.2 part by weight of a boron trifluoride complex based on benzylamine, as a 45 percent strength solutioin in dioctyl phthalate, is then added with good stirring. The temperature is raised to about 180°C and is maintained thereat for about a further 30 minutes.

Shear strength : 5.2 Kp/cm²
Peel strength : 0.7 Kp/cm
Heat resistance at 70°C : 59 minutes The carrier material, for example bituminized heavy paper, is coated with the reaction product 6, applying a coating thickness of approx. 200 μ at 180°C. The material can be used as described in Example 4. The adhesive bond corresponds to the test data which have been given.

Example 7:

Manufacture of Reaction Product 7

100 parts by weight of copolymer 2 (as component A) are mixed with 1 part by weight of the polyepoxide compound 1 as the polyepoxide compound (component B) and heated by warming to about 160°C in order to obtain a homogeneous melt of low viscosity. 0.3 part by weight of a boron trifluoride complex based on benzylamine, as a 45 percent strength by weight solution in dioctyl phthalate, is then added with good stirring. The temperature is raised to about 180°C and is maintained thereat for about a further 30 minutes.

Shear strength : 5.2 Kp/cm²
Peel strength : 0.7 Kp/cm
Heat resistance : 63 minutes The carrier material, for example bituminized heavy paper, is coated with the reaction product 7 at a temperature of 180°C, using a coating thickness of 200 μ. In glue lines, an approximately four-fold increase in heat resistance, from 15 minutes to 63 minutes, was found. The heat resistance was determined in the test already indicated. The material can be used further as described in Example 4.

Manufacture of the Polyepoxide Compound 2:

250 g of xylene, 50 g of butanol, 100 g of methyl methacrylate, 45 g of acrylonitrile, 58 g of glycidyl methacrylate and 447 g of ethylhexyl acrylate are heated under reflux in a glass flask equipped with a stirrer and reflux condenser and a mixture consisting of 50 g of xylene and 7 g of di-tert.-butyl peroxide is added over the course of 90 minutes, and polymerization is continued at the reflux temperature for a further 4 hours, until a solids content of 65 percent by weight is reached. Thereafter the solvent mixture is stripped off in vacuo until a solids content of 100 percent is reached. The copolymer has a viscosity, as a 50 percent strength by weight solution in xylene, of 550 cP at 20°C.

Example 8:

Manufacture of Reaction Product 8

100 parts by weight of copolymer 2 (as component A) are mixed with 5 parts by weight of the polyepoxide compound 2 (as component B) and heated by warming to about 160°C in order to obtain a homogeneous melt of low viscosity. 0.5 part by weight of a boron trifluoride complex based on benzylamine, as a 45 percent strength by weight solution in dioctyl phthalate, is then added with good stirring. The temperature is raised to about 180°C and is maintained thereat for about a further 30 minutes.

Shear strength : 5.2 Kp/cm²
Peel strength : 0.7 Kp/cm
Heat resistance : 51 minutes The carrier material, for example bituminized heavy paper, is coated with the reaction product 8, applying a coating thickness of approx. 200 μ at 180°C. The materal can be used as described in Example 4. The adhesive bond corresponds to the test data which have been given.

The shear strengths for Examples 6 to 8 are in fact above the indicated values, since the test film tore during testing.

Example 9:
Manufacture of Reaction Product 9

100 parts by weight of copolymer 1 are mixed with 2.0 parts by weight of the polyepoxide compound 1 as the polyepoxide compound in a heatable kneader and heated to about 160°C. During the time of heating 4 parts by weight of a highly dispersed silicic acid are kneaded into the mix together with 0.5 part by weight of common anti-aging agent based on phenolic compounds. After all components have been stirred to be mixed homogeneously, the mix is brought to reaction by addition of 0.4 part by weight of boron trifluoride complex based on benzylamine, as a 45 percent strength by weight solution in polypropylene glycol. In order to achieve an optimal reaction, the temperature is maintained at 160°C for another 30 minutes. Damping sheets based on bituminized heavy paper or based on cardboard concealed with PVC or on Kraft paper having a thickness of about 100 μ were coated using the reaction product of Example 9. These coated damping sheets were glued to car bodywork sheet metal by pressing the hot-melt adhesive side against the bodywork. The glued bodywork sheet metal was kept vertically at 100°C for 24 hours and no slipping off of the damping sheets happened.

A damping sheet coated in the same manner using the copolymer 1 as comparison thereto slipped off already during the first hour at 75°C.

The following Examples 10 to 16 show the production of hot-melt adhesives in absence of catalysts and the use of such adhesives.

The gluing with hot-melt adhesives obtained according to Examples 12, 15, 16 was carried out analogously to the manner described in Examples 1 to 9.

The gluing with hot-melt adhesives obtained according to Examples 10, 11, 13 and 14 was carried out by applying the extruded warmed hot-melt adhesive with the aid of a wide-slit nozzle.

| Ex. No. | Copolymer 1 (WP) weight parts | kind of polyepoxide compound | amount of WP = weight parts of polyepoxide compound |
|---|---|---|---|
| 10 | 100 WP | bisphenol A/epichlorohydrin epoxy equiv. ~190 viscosity 12,000 cP | 0.5 WP |
| 11 | 100 WP | epoxidized soya oil | 1 WP |
| 12 | 100 WP | epoxidized fatty acid monoester epoxy equiv. ~350 viscosity 30 cP | 4 WP |
| 13 | 100 WP | polyolglycidylether epoxy equiv. = 145 viscosity 550 cP | 0.4 WP |
| 14 | 100 WP | do. | 0.8 WP |
| 15 | 100 WP | cycloaliphatic diepoxy compound epoxy equiv. = 130 viscosity 400 cP | 1 WP |
| 16 | 100 WP | epoxy resin internally plasticized by polyols, based on bisphenol A/ epichlorohydrin epoxy equiv. = 450 viscosity 25,000 cP | 1 WP |

| Example No. | reaction temperature | reaction time | anti-ageing agent kind | amount |
|---|---|---|---|---|
| 10 | 240°C | 3 h | 4,4'-methylene-bis-2,6-di-tertiary-butylphenol | 0.5 WP |
| 11 | 240°C | 2 h | do. | 0.5 WP |
| 12 | 240°C | 4 h | do. | 0.5 WP |
| 13 | 240°C | 3 h | do. | 0.5 WP |
| 14 | 240°C | 2 h | 1,3,5-Trimethyl-2,4,6-tris(3,5-di-tert.-butyl-4-hydroxybenzyl)benzene | 0.5 WP |
| 15 | 240°C | 8 h | do. | 0.5 WP |
| 16 | 240°C | 7 h | do. | 0.5 WP |

The following Examples 17 to 32 show the use of catalysts based on tertiary organic amines as well as on alkali soaps of fatty acids. Here aliphatic, aromatic, cycloaliphatic polyepoxides and epoxidized fatty acid esters were used as the polyepoxide compound, and an epoxidized fatty acid monoester was used as the monoepoxide compound for the production of the hot-melt adhesive.

| Example No. | copolymer 1 weight parts | polyepoxide compound kind | amount WP | catalyst kind | amount WP |
|---|---|---|---|---|---|
| 17 | 100 WP | epoxy resin based on bisphenol A/epichlorohydrin epoxy equiv. = 190 viscosity 12,000 cP | 0.4 | lithium ricinolate | 0.2 |
| 18 | 100 WP | do. | 0.4 | diazabicylooctane | 0.2 |
| 19 | 100 WP | cycloaliphatic diepoxide compound epoxy equiv. = 130 viscosity 400 cP | 0.3 | do. | 0.2 |
| 20 | 100 WP | polyolglycidylether epoxy equiv. = 145 viscosity 550 cP | 0.1 | do. | 0.2 |
| 21 | 100 WP | polyolglycidylether epoxy equiv. = 145 viscosity | 0.2 | diazabicyclooctane | 0.2 |

Table — Continued

| Example No. | copolymer 1 weight parts | polyepoxide compound kind | amount WP | catalyst kind | amount WP |
|---|---|---|---|---|---|
| 22 | 100 WP | do. 550 cP | 0.2 | 2,4,6-tris(dimethylaminomethyl)phenol | 0.2 |
| 23 | 100 WP | do. | 0.2 | bis(N,N'-dimethylaminoisobutylidene) melamine | 0.2 |
| 24 | 100 WP | epoxidized soya oil | 0.5 | diaza-bicyclooctane | 0.2 |
| 25 | 100 WP | epoxidized fatty acid monoester epoxy equiv. = 350 viscosity = 30 cP | 4 | do. | 0.2 |
| 26 | 100 WP | epoxy resin internally plasticized by polyols, based on bisphenolA/ epichlorohydrin epoxy equiv. = 450 viscosity 25,000 cP | 1 | 2,4,6-tris-(dimethylaminomethyl)phenol | 0.2 |
| 27 | 100 WP | do. | 0.5 | do. | 0.2 |
| copolymer 2 | | | | | |
| 28 | 100 WP | do. | 0.2 | do. | 0.2 |
| 29 | 100 WP | polyolglycidylether epoxy equiv. = 145 viscosity 550 cP | 0.1 | diaza-bicyclooctane | 0.2 |
| 30 | 100 WP | epoxidized soya oil | 0.2 | do. | 0.2 |
| 31 | 100 WP | epoxidized fatty acid monoester epoxy equiv. = 350 viscosity 30cP | 1.5 | lithium ricinolate | 0.2 |
| 32 | 100 WP | do. | 1.5 | BF$_3$-monoethyl-amine-complex | 0.2 |

| Example No. | anti-ageing agent kind | amount | reaction time | reaction temp. |
|---|---|---|---|---|
| 17 | polymeric sterically hindered phenol | 0.5 | 2 h | 180°C |
| 18 | do. | 0.5 | 15 min | 180°C |
| 19 | do. | 0.5 | 30 min | 180°C |
| 20 | 4,4'-methylene-bis-2,6-ditert.-butyl-phenol | 0.5 | 30 min | 180°C |
| 21 | butylated hydroxytoluene | 0.5 | 30 min | 180°C |
| 22 | polymeric sterically hindered phenol | 0.5 | 1 h | 180°C |
| 23 | do. | 0.5 | 30 min | 180°C |
| 24 | 1,3,5-trimethyl-2,4,6-tris(3,5-ditert.-butyl-4-hydroxybenzyl)benzene | 0.5 | 30 min | 180°C |
| 25 | do. | 0.5 | 1 h | 180°C |
| 26 | 4,4'-methylene-bis-2,6-ditert.-butylphenol | 0.5 | 1 h | 180°C |
| 27 | butylated hydroxytoluene | 0.5 | 1 h | 180°C |
| 28 | 4,4'-methylene-bis-2,6-ditert.-butylphenol | 0.5 | 1 h | 180°C |
| 29 | do. | 0.5 | 30 min | 180°C |
| 30 | do. | 0.5 | 30 min | 180°C |
| 31 | do. | 0.5 | 2 h | 180°C |
| 32 | do. | 0.5 | 1 h | 180°C |

The hot-melt adhesives made according to Examples 19, 20, 25, 29, 30, 31 and 32 were worked in the melt in a manner analogous to that described in Examples 1 to 9.

The gluings of hot-melt adhesives according to Examples 17, 18, 21, 22, 23, 24, 26 and 28 were made by applying the extruded warmed hot-melt adhesive with the aid of a wide slit nozzle.

What is claimed is:

1. Process for gluing solid materials by applying warmed thermoplastics as hot-melt adhesives and allowing the thermoplastics to cool in contact with at least one material which is to be bonded, characterized in that the hot-melt adhesives used are reaction products of:

A. 90 – 99.5 percent by weight of copolymers of:
 a. 1– 20 percent by weight of nitriles of $\alpha,\beta$-ethylenically unsaturated monocarboxylic or dicarboxylic acids, used individually or as mixtures,
 b. 1– 20 percent by weight of amides of $\alpha,\beta$-ethylenically unsaturated monocarboxylic or dicarboxylic acids, used individually or as mixtures,
 c. 40 – 97 percent by weight of esters of $\alpha,\beta$-ethylenically unsaturated monocarboxylic or dicarboxylic acids, used individually or as mixtures, and containing four to 12 carbon atoms in the alcohol radical and
 d. 1 – 30 percent by weight of methyl methacrylate, with the percent by weight of (a), (b), (c) and (d) having to add up to 100 percent by weight, with B. 0.5 – 10 percent by weight of epoxide compounds and C. optionally, in the presence of solvents or extenders or both with the percent by weight of (A.) and (B.) having to add up to 100 percent by weight.

2. Process according to claim 1, characterized in that a reaction product of copolymer (A.), synthesized from components (a) to (d), with the polyepoxide compound is employed which has been formed in the presence of catalysts.

3. Process according to claim 1, characterized in that polyepoxide compounds are employed as component B.

4. Process according to claim 1, characterized in that the hot-melt adhesive employed contains, in the partial component (A.).
   a. as nitriles of $\alpha,\beta$-ethylenically unsaturated monocarboxylic or dicarboxylic acids, individually or as mixtures, acrylonitrile, methacrylonitrile, maleic acid dinitrile or fumaric acid dinitrile or the mononitriles of maleic acid or fumaric acid monoesters, with the alcohol radical in the monoester possessing one to 18 carbon atoms,
   b. as amides of $\alpha,\beta$-ethylenically unsaturated monocarboxylic or dicarboxylic acids, individually or as mixtures, acrylamide, methacrylamide, maleic acid diamide or fumaric acid diamide or the monodiamides of maleic acid or fumaric acid monoesters, with the alcohol radical in the monoester possessing one to 18 carbon atoms,
   c. as esters of $\alpha,\beta$-ethylenically unsaturated monocarboxylic or dicarboxylic acids, individually or as mixtures, n-butyl acrylate, hexyl acrylate, 2-ethylhexyl acrylate, decyl acrylate and dodecyl arcylate or n-butyl methacrylate, hexyl methacrylate, 2-ethylhexyl methacrylate, decyl methacrylate and dodecyl methacrylate.

5. Process according to claim 1, characterized in that the hot-melt adhesive employed contains, as polyepoxide compounds in the partial component (B.), polymer resins which contain copolymerized glycidyl esters of unsaturated carboxylic acids.

6. Process according to claim 5, characterized in that the hot-melt adhesive employed contains, in the partial component (B.) as polyepoxide compound copolymers of:
   a. 1 – 20 percent by weight of nitriles of $\alpha,\beta$-ethylenically unsaturated monocarboxylic or dicarboxylic acids, used individually or as mixtures,
   b. 1 – 20 percent by weight of glycidyl esters of unsaturated carboxylic acids, such as acrylic, methacrylic, fumaric, maleic, crotonic and itaconic acid, or allyl glycidyl ethers,
   c. 40 – 98 percent by weight of esters of $\alpha,\beta$-ethylenically unsaturated monocarboxylic or dicarboxylic acids, used individually or as mixtures, and containing four to 12 carbon atoms in the alcohol radical,
   d. 0 – 30 percent by weight of methyl methacrylate and
   e. 0 – 40 percent by weight of styrene, with the percent by weight of the components (a), (b), (c), (d) and (e) having to add up to 100 percent.

7. Hot-melt adhesive as agent for carrying out the process according to claim 1, characterized in that the hot-melt adhesive consists of reaction products of
   A. 90 – 99.5 percent by weight of copolymers of:
      a. 1 – 20 percent by weight of nitriles of $\alpha,\beta$-ethylenically unsaturated monocarboxylic or dicarboxylic acids, used individually or as mixtures,
      b. 1 – 20 percent by weight of amides of $\alpha,\beta$-ethylenically unsaturated monocarboxylic or dicarboxylic acids, used individually or as mixtures,
      c. 40 – 97 percent by weight of esters of $\alpha,\beta$-ethylenically unsaturated monocarboxylic or dicarboxylic acids, used individually or as mixtures, and containing four to 12 carbon atoms in the alcohol radical and
      d. 1 – 30 percent by weight of methyl methacrylate, with the percent by weight of (a), (b), (c) and (d) having to add up to 100 percent by weight, with
   B. 0.5 – 10 percent by weight of epoxide compounds and
   C. optionally, in the presence of solvents or extenders or both with the percent by weight of (A.) and (B.) having to add up to 100 percent by weight.

* * * * *

UNITED STATES PATENT OFFICE
CERTIFICATE OF CORRECTION

Patent No. 3,819,447   Dated June 25, 1974

Inventor(s) Dr. Horst Dalibor, et al.

It is certified that error appears in the above-identified patent and that said Letters Patent are hereby corrected as shown below:

| | | |
|---|---|---|
| Col. 3, line 65 | "etylene" | should read -- ethylene -- |
| Col. 4, line 34 | "atoms" | should read -- carbon atoms -- |
| Col. 6, line 4 | "1 to 20 percent" | should read -- 1 to 200 percent -- |
| Col. 11, line 51 | "glue bend" | should read -- glue bond -- |
| Col. 12, line 36 | "disphenol A" | should read -- bisphenol A -- |
| Col. 13, line 63 | "component A)" | should read -- (as component A) -- |
| Col. 13, line 69 | "solutioin" | should read -- solution in -- |
| Col. 14, lines 69-70 | "materal" | should read -- material -- |
| Col. 19, lines 32-33 (Claim 4) | "arcylate" | should read -- acrylate -- |

Signed and sealed this 7th day of January 1975.

(SEAL)
Attest:

McCOY M. GIBSON JR.
Attesting Officer

C. MARSHALL DANN
Commissioner of Patents